United States Patent [19]

Hugley

[11] 4,243,073
[45] Jan. 6, 1981

[54] SURGE STABILIZER

[76] Inventor: Dale G. Hugley, Box 465, Kennedale, Tex. 76060

[21] Appl. No.: 17,046

[22] Filed: Mar. 2, 1979

[51] Int. Cl.³ ............................................. F16L 55/00
[52] U.S. Cl. ...................................... 138/26; 138/30; 138/31
[58] Field of Search ........................... 138/26, 30, 31; 220/85 B; 137/593

[56] References Cited

U.S. PATENT DOCUMENTS

| | | | |
|---|---|---|---|
| 1,963,270 | 6/1934 | Huffman et al. | 138/31 |
| 2,319,941 | 5/1943 | McNeal | 138/31 |
| 3,138,176 | 6/1964 | Mercier | 138/30 |
| 3,319,420 | 5/1967 | Mercier | 138/30 |
| 3,376,898 | 4/1968 | Hugley | 138/30 X |
| 3,433,268 | 3/1969 | Greer | 138/30 |
| 3,511,280 | 5/1970 | Mercier | 138/30 |
| 4,153,079 | 5/1979 | Ambrose | 138/30 X |

Primary Examiner—James E. Bryant, III
Attorney, Agent, or Firm—Thomas L. Cantrell; Joseph H. Schley

[57] ABSTRACT

Disclosed is an improved surge stabilizer for reducing and controlling pressure surges and vibrations which cause destructive wear to pumps. The stabilizer includes a cylindrical case which is placed in pressure communication with the pump working fluid, and an internal pressurizable cylindrical cartridge having a flexible sidewall and end caps, one of which is attached to one end of the case. A control rod is slidingly fitted in bores in the caps, thereby eliminating the tendency of the cartridge to "piston" longitudinally. Further control of the compression characteristics of the cartridge is obtained by providing multiple plies of equal length in the sidewall of the cartridge, and by utilizing reinforcing cords in the plies wrapped at a selected bias or angle.

6 Claims, 9 Drawing Figures

SURGE STABILIZER

BACKGROUND OF THE INVENTION

Surge stabilizers are employed in the pumping art to control and reduce pressure surges and vibrations generated by the pumping action, in order to reduce or minimize destructive wear on parts of the pump and the piping network in which the pump is mounted. One such stabilizer is disclosed in Hugley U.S. Pat. No. 3,376,898 issued Apr. 9, 1968.

Typically, a surge stabilizer includes a cylindrical housing or case, and fittings for placing the interior of the case in pressure communication with the working fluid being pumped. Thus, whatever pressure surges occur in the working fluid will also occur in the case. Mounted within the stabilizer case is a cartridge or boot which is cylindrical in shape and has a flexible sidewall, together with relatively more rigid end caps, one of which is utilized to mount the cartridge in the case. Means are provided for pressurizing the interior of the cartridge with a gas, and it is normally so pressurized to a level selected with a view to the pressure conditions in the working fluid.

When a pressure surge occurs in the case, the energy involved is largely devoted to compressing the cartridge, and when a pressure rarefaction occurs, the energy stored as energy of compression in the cartridge is returned to the working fluid to restore its pressure. The net effect is to smooth out or dampen the pressure surges in the working fluid.

The manner in which the cartridge compresses within the case is of importance in the performance of the stabilizer, and in the wear life of the cartridge. When a pressure surge occurs, the cartridge is reduced in volume. It is preferred that the shrinkage occur as a shortening of the length of the cartridge, accompained and somewhat offset by an increase in its diameter substantially to the inside diameter of the case. However, in prior devices it has not always been possible to attain this mode of compression. Often the free floating end cap of the cartridge will "piston" or translate longitudinally into the boot. This hinders the smoothness of the operation and produces objectionably high wear in the flexible wall of the cartridge.

SUMMARY OF THE INVENTION

In accordance with one aspect of the invention, control of the mode of compression of the cartridge is attained by slidingly mounting a control rod internally of the cartridge in aligned bores in the end caps of the cartridge. The length of the control rod is selected with a view to the operating conditions of the stabilizer so that the ends of the control rod "bottom" in the bores of the end caps when the desired degree of foreshortening of the cartridge is reached upon the occurence of a pressure surge.

In accordance with another aspect of the invention, further control of the flexure properties of the cartridge is obtained by reinforcing its flexible wall with reinforcing cord set at a selected bias or angle with respect to the cartridge axis. The smaller the bias, the less flexible the cartridge wall will be.

Additionally, control of cartridge flexure is obtained in accordance with the invention, by providing a multi-ply cartridge wall, when operating conditions indicate such a wall is required, in which the plies are bonded together at the ends of the cartridge, but are separated in the mid region thereof by separators of selected and equal length.

From the foregoing, it can be seen that a principal object of the present invention is the provision of an improved surge stabilizer in which the flexure properties of the cartridge are simply and effectively controlled.

The manner in which this object, together with other objects and purposes of the invention are attained may best be understood by a consideration of the detailed description which follows, together with the accompanying drawings.

DESCRIPTION OF THE PREFERRED EMBODIMENTS

Figure 1:
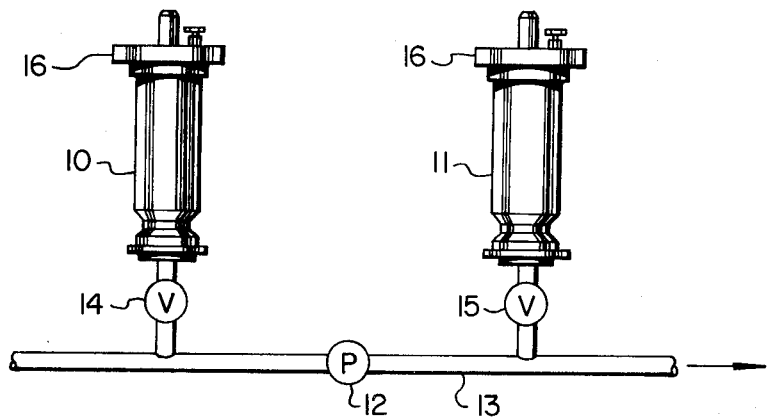
FIG. 1 is a somewhat diagrammatic elevational view of two pulse stabilizers of the invention in association with a pump.

In FIG. 1, two pulse stabilizers 10, 11 of the invention are shown mounted in association with pump 12, in line 13. Stabilizer 10 is mounted in communication with the inlet side of the pump, while stabilizer 11 is mounted in communication with the outlet side of the pump. Valves 14 and 15 provide for isolating the stabilizers from line 13 for servicing. Each stabilizer is preferably provided with a safety hood 16 of the kind shown and claimed in Hugley U.S. Pat. No. 4,122,969 issued Oct. 31, 1978. In FIG. 1, stabilizers 10 and 11 are shown oriented vertically, with their safety hoods at their upper ends, but stabilizers may be installed in other orientations, including horizontally or with their safety hoods facing downwardly.

Figure 2:
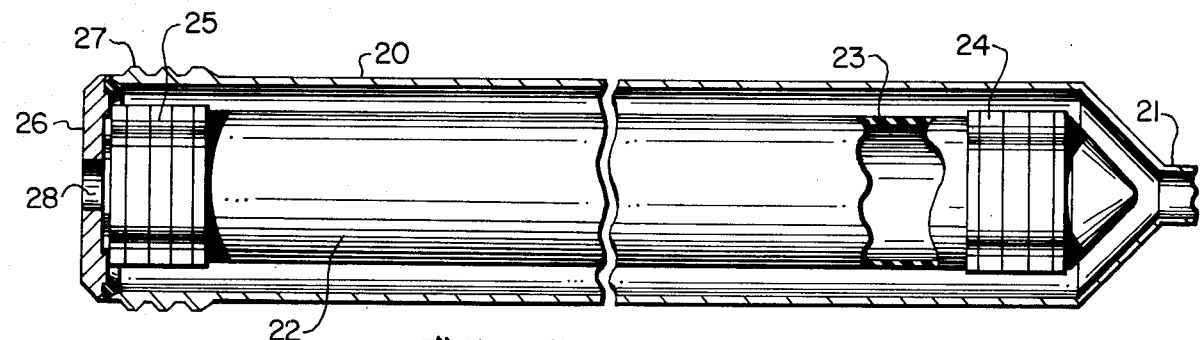
FIGS. 2, 3 and 4 are sectional views, on an enlarged scale as compared to FIG. 1, of a typical stabilizer of the prior art, showing sequential stages of compression of the cartridge.
Figure 3:
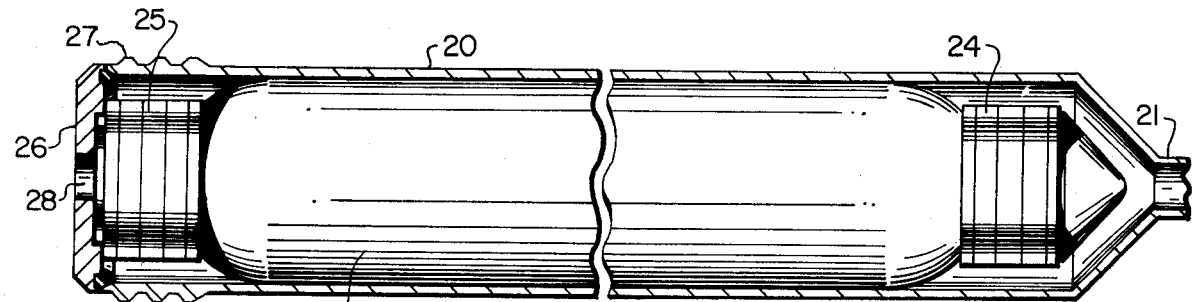
Figure 4:
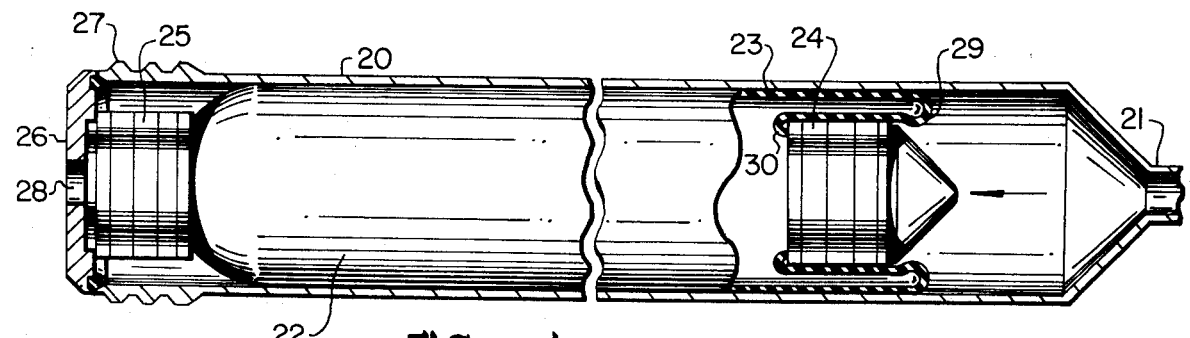

A typical stabilizer of the prior art is shown in the sectional elevational views of FIGS. 2-4, which illustrate successive steps in the compression of the cartridge upon receipt of a pressure surge. The same reference characters are used throughout these FIGS. The prior art stabilizer includes a cylindrical case 20, having an outlet 21 for establishing pressure communication with a line through which fluid is being pumped, such as line 13 of FIG. 1. A generally cylindrical cartridge 22 is mounted in case 21 and occupies the bulk of the internal volume thereof. The cartridge has a flexible wall 23 which is bonded to end caps 24, 25. End cap 25 is mounted on end plate 26 of case 20, while cap 24 is free-floating within the case. End plate 26 is secured to the body of case 20 by a closure nut (not shown) threaded onto threads 27, and has an aperture 28 therethrough. A valve (not shown) may be fitted in the aperture to provide for pressurizing the cartridge with a suitable gas, at a pressure selected in view of the pressure in the line being pumped.

FIGS. 2-4 show successive stages in the response of cartridge 22 to a pressure surge entering case 20 through outlet 21. FIG. 2 shows the cartridges in its fully extended uncompressed position, just before receipt of a pressure surge. FIG. 3 shows the cartridge partially compressed by the pressure surge. It is foreshortened in length, and its diameter is increased to bear against the inner surface of case 20. Overall, its volume is decreased.

Prior workers desired that the situation shown in FIG. 3 represent the full extent of volume reduction of cartridge 22 upon receipt of a pressure surge. However, under many conditions, the situation progresses to the undesirable condition illustrated in FIG. 4. The cartridge reduces further in volume, and the manner in which it does so is by "pistoning" or collapsing of free-floating end cap 24 into the cartridge, as shown in FIG. 4. The pistoning action imposes a severe folding on flexible wall 23, as at 29, 30 which materially shortens its wear life. In addition, the shift in mode of foreshortening from that of FIG. 3 to that of FIG. 4 tends to accentuate rather than dampen vibrations.

If FIGS. 2-4 are viewed in the sequence 4-3-2, the action of the cartridge 22 upon the occurence of a pressure rarefaction following a pressure surge may be understood. The undesirable pistoning action again occurs as the cartridge expands to its full volume.

Figure 5:
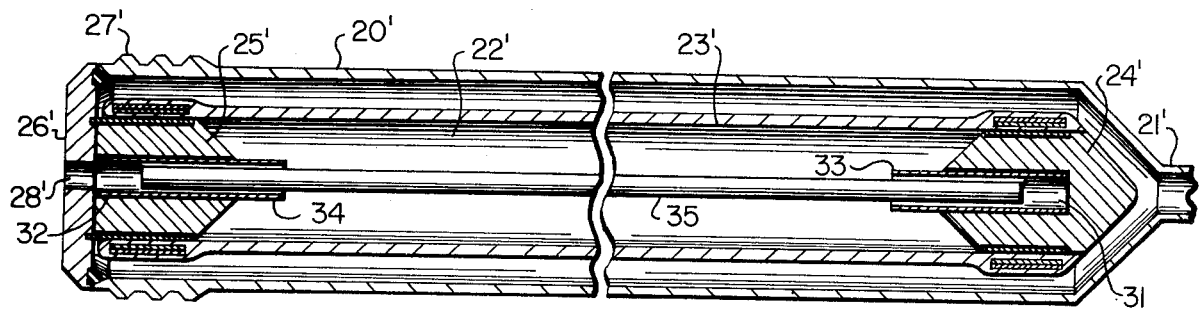
FIGS. 5 and 6 are sectional views of a stabilizer of the invention, showing sequential stages of compression of the cartridge.
Figure 6:
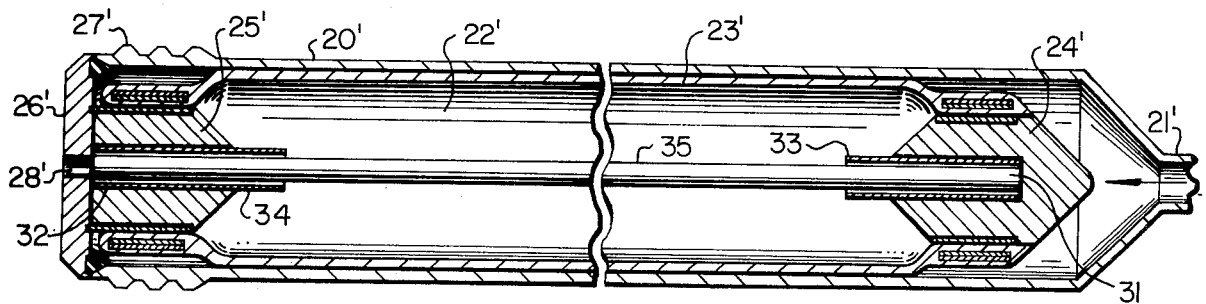

The manner in which the defect in prior art practice outlined in the discussion of FIGS. 2-4 is overcome in accordance with one aspect of the present invention is illustrated in FIGS. 5 and 6. The components in these FIGS. are identified by the same reference characters as were employed in FIGS. 2-4, but with primes added.

As can be seen in FIGS. 5 and 6, end caps 24' and 25' are provided with aligned bores 31, 32, respectively. It is preferred that bores 31, 32 be positioned on the axis of cartridge 22. Preferably the bores are fitted with bushings 33, 34. In accordance with the invention, a control rod 35 is slidingly fitted in bores 31, 32 (and bushings 33, 34). Rod 35 is of selected length shorter than the bore-bottom-to-bore-bottom distance. It is preferred that rod 35 be slidable in both bores, although it may be fixed in one, or otherwise fixed to one end cap or the other. In the preferred arrangement, the precise position of rod 35 during operations will be somewhat indeterminate if the unit is mounted horizontally as shown in FIGS. 5 and 6. If the unit is mounted vertically or at an angle, rod 35 will tend to bottom or seat in the bore of whichever end cap is lower.

The length of rod 35 is selected in view of the bore-bottom-to-bore-bottom dimension of the cartridge, the flexure properties of the cartridge wall, the operating pressure, and the magnitude of its fluctuation during operations so that the rod will "bottom" in both bores when the cartridge has foreshortened to the desired degree and has expanded in diameter to the inner surface of the case. In this manner the objectionable "pistoning" described above is eliminated without otherwise affecting the performance of the unit.

The mode of operation of the improved pulse stabilizer of the invention may be understood by considering FIGS. 5 and 6 in the sequence 5-6-5. In FIG. 5, the cartridge is at its maximum volume and extension, just before receiving a pressure surge. Rod 35 is shown bottomed in neither bore, although it may be bottomed in one or the other, as pointed out above. Upon receipt of a pressure surge, the cartridge foreshortens and reduces in volume as shown in FIG. 6. It also increases in diameter to contact the inner surface of case 20'. Rod 35 "bottoms" in both bores so that "pistoning" does not and cannot occur.

Following a pressure surge, a pressure rarefaction occurs in the unit, and the cartridge expands in volume and lengthens to the configuration shown in FIG. 5. Again, pistoning does not and cannot occur in this portion of the cycle.

Figure 7:
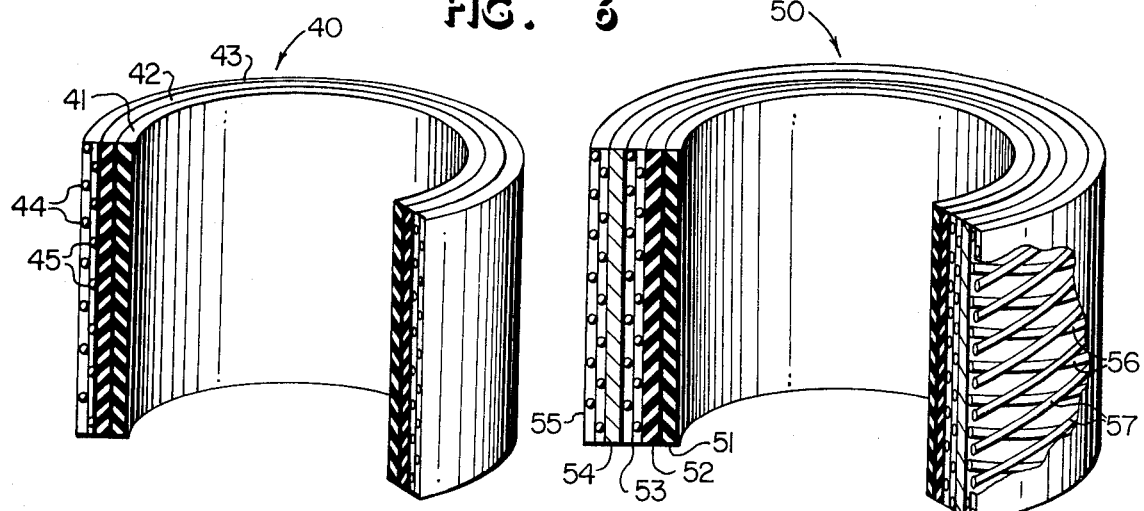
FIG. 7 is an isometric view, on a further enlarged scale, of a portion of a single-ply cartridge wall constructed in accordance with the invention.
Figure 8:
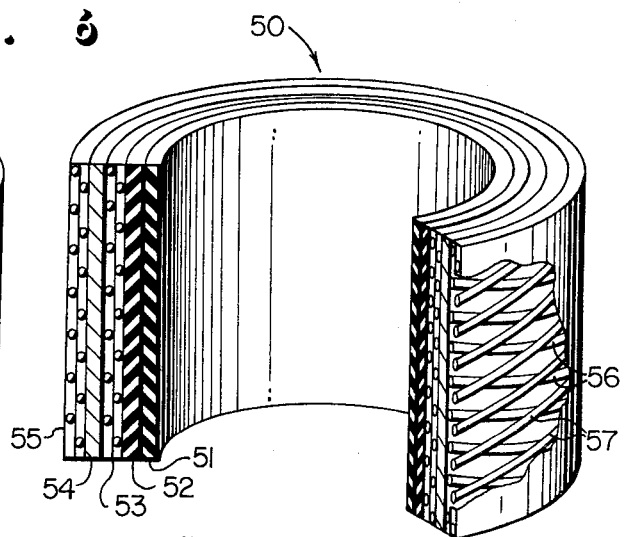
FIG. 8 is a similar isometric view of a portion of a two-ply cartridge wall constructed in accordance with the invention.
Figure 9:
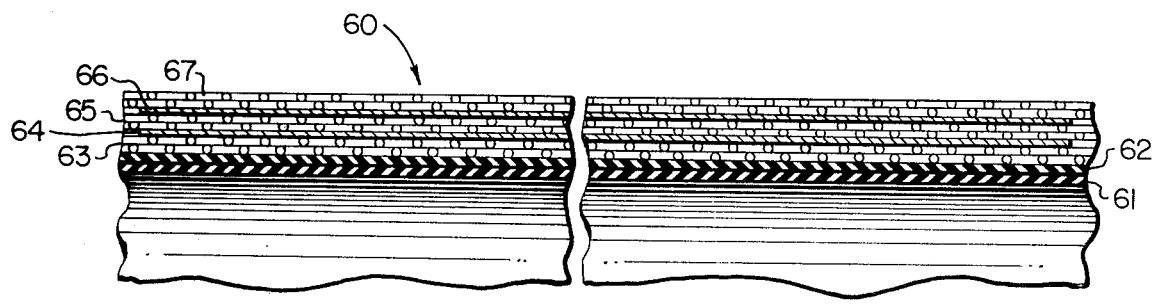
FIG. 9 is a fragmentary sectional view, on a still further enlarged scale, of a three-ply cartridge wall constructed in accordance with the invention.

It is preferred that the anti-pistoning rod of the invention be employed in conjunction with other wall flexure control aspects of the invention illustrated in FIGS. 7, 8 and 9. All of the cartridge walls there shown are provided with reinforcing cord wrapped at a bias or angle to the axis of the cartridge, the angle preferably being between about 0° and about 30°. The larger the bias, the more flexible the wall will be.

In FIG. 7, a single-ply wall 40 is shown. It is made up of two elastomer layers 41, 42 and a layer 43 having oppositely pitched reinforcing cords 44, 45 imbedded therein. All layers are bonded together into a single-ply.

The two-ply wall 50 comprises elastomer layers 51, 52 a first reinforcing cord layer 53, a separator 54, and a second reinforcing cord layer 55. Layers 51, 52 and 53 are bonded together, but layers 54 and 55 are not, as is explained more fully below. The reinforcing cord layers 53 and 55 contain cords 56 pitched at an opposite angle to cords 57.

FIG. 9 illustrates a three-ply wall 60, and may be taken as illustrative of walls containing even more plies. The wall comprises elastomer layers 61, 62, first reinforcing cord layer 63, first separator 64, second reinforcing cord layer 65, second separator 66, and third reinforcing cord layer 67. It should be noted that separators 64 and 66 are shorter than the other layers, and are of equal length. In the end regions of the wall layers 61, 62, 63, 65 and 67 are bonded together. But in the mid portions of the wall containing separators 64 and 66, only layers 61, 62 and 63 are bonded together. In this manner some independence of movement or flexure between the unbonded layers is obtained. Again, the cords in the various layers are bias wrapped. The bias may be varied from layer to layer.

I claim:
1. An improved surge stabilizer comprising:
an elongated generally cylindrical case;
means for placing the interior of said case in pressure communication with a line subject to pressure surges;
a generally cylindrical pressurizable cartridge having a longitudinal axis and having a flexible wall containing reinforcing cords positioned at an angle between about 0° and about 30° to the axis of said cartridge and further having end caps, said cartridge being positioned within said case and being attached to said case through one of said end caps; said cartridge being so proportioned with respect to said case that its flexible wall is out of contact with the inner surface of said case when it is pressurized but uncompressed; and
a control rod of selected length engagable with both of said caps disposed within said cartridge between said caps for limiting the distance said caps may displace toward each other upon receipt of a pressure surge within the case, the selected length of said control rod being such that said rod engages said end caps in displacement limiting engagement substantially simultaneously with engagement of said flexible wall with the inner surface of said case upon receipt of a pressure surge.

2. Apparatus in accordance with claim 1 in which said end caps are provided with aligned bores and said control rod is slidably mounted in said bores.

3. Apparatus in accordance with claim 2 in which said aligned bores are further aligned substantially on the axis of said cartridge.

4. Apparatus in accordance with claim 2 and further comprising bushings in said bores.

5. Apparatus in accordance with claim 1 in which said flexible wall contains a plurality of layers of said reinforcing cords and said layers are separated from one another by separator layers having a length less than the length of said wall.

6. Apparatus in accordance with claim 5 in which said flexible wall contains at least three layers of said reinforcing cords and said separators are of equal lengths and have their ends aligned.

* * * * *